Figure 1:
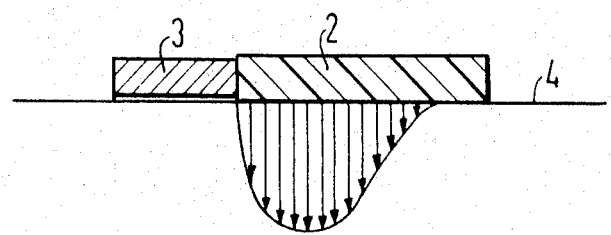

United States Patent
Kreuzer

[11] 3,774,919
[45] Nov. 27, 1973

[54] SEALED BEARING ARRANGEMENT

[75] Inventor: Dieter Kreuzer, Schewinfurt am Main, Germany

[73] Assignee: Fichtel & Sachs AG, Schweinfurt am Main, Germany

[22] Filed: Nov. 15, 1971

[21] Appl. No.: 198,751

[30] Foreign Application Priority Data
Nov. 20, 1970 Germany.................. P 20 57 027.8

[52] U.S. Cl. .............................................. 277/165
[51] Int. Cl. ............................................ F16j 15/24
[58] Field of Search................... 277/138, 142, 165

[56] References Cited
UNITED STATES PATENTS

| 3,300,225 | 1/1967 | Shepler | 277/165 |
| 2,745,660 | 5/1956 | Delahay | 277/165 X |
| 2,745,704 | 5/1956 | D'Errico | 277/165 |

Primary Examiner—George E. Lowrance
Assistant Examiner—Robert I. Smith
Attorney—Kurt Kelman et al.

[57] ABSTRACT

The gap between two movably engaged cylindrical surfaces which connects spaces of different fluid pressure is sealed by an elastomeric ring partly received in an annular recess in one of the surfaces, biased outward of the recess by a resilient pressure ring into engagement with the other surface, and compressed axially by a metal ring movable on the other surface and interposed between the sealing ring and the space of higher fluid pressure.

8 Claims, 3 Drawing Figures

SEALED BEARING ARRANGEMENT

This invention relates to bearing arrangements in which two elements movably relative to each other define a narrow gap between respective surfaces thereof, and particularly to a sealing arrangement for impeding flow of fluid between respective portions of the gap which communicate with areas of different fluid pressure.

The invention will be discussed first with reference to a piston rod movable passing through the end wall of a cylinder, but is not limited to this application as will presently become apparent.

It is common practice to form an annular recess in the cylindrical surface of the end wall which provides a bearing for the piston rod, and to have a sealing ring project from the recess toward the piston rod surface. It has also been proposed to provide pressure means in the recess which bias the sealing ring toward the other face.

The contact pressure between the sealing ring and the cylindrical surface of the piston is directly related to the pressure differential between the two end portions of the gap separated by the sealing arrangement if the latter is to be fluid tight. The resulting friction absorbs a significant portion of the energy employed for moving the piston in the bearing wall. If the piston and cylinders are elements of an automotive shock absorber, the friction losses in the bearing arrangement unfavorably affect the rider of a vehicle equipped with such a shock absorber. If the contact pressure is reduced to a value consistent with a relatively free movement of the piston rod in the cylinder wall, fluid, and particularly oil leakage is unavoidable and provisions must be made for returning the leaked fluid or for replacing it.

The primary object of the invention is the provision of a bearing arrangement of the type described in which an adequate seal is provided at relatively low average contact pressure and correspondingly low friction losses.

The improvement contributed by this invention is generally applicable to bearing arrangements in which two elements are arranged for relative movement and have respective surfaces extending in a common direction, the surfaces defining a narrow gap therebetween, and a fluid pressure being maintained in a first portion of the gap higher than the fluid pressure in a second gap portion during normal operation of the arrangement, the two portions of the gap being spaced in the aforementioned common direction. A sealing arrangement is provided in a third portion of the gap intermediate the first and second portions for impeding fluid flow from the first toward the second gap portion. The surface of one element in the gap is formed with a recess in which a sealing member is partly received. A pressure device presses the sealing member into conforming engagement with the surface of the other element in the gap.

The improved sealing arrangement of the invention includes a backing member movable in the gap relative to the surface of the other element. Two oppositely directed faces of the backing member are spaced in the aforementioned common direction, one face abuttingly engaging the sealing member and the other face being directed toward the portion of the gap in which a higher pressure is normally maintained, and exposed to the higher pressure.

Figure 2:
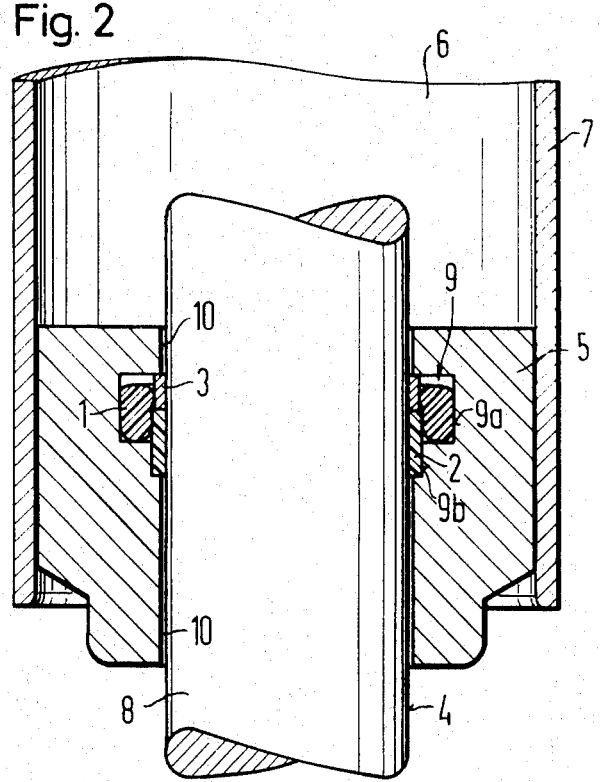
Figure 3:
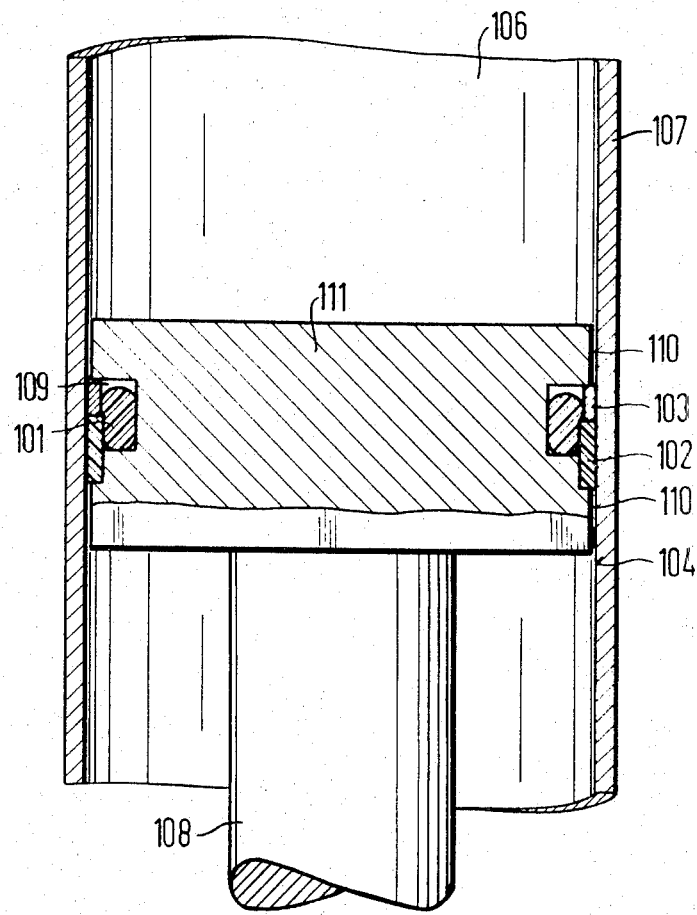

Other features, additional objects, and many of the attendant advantages of this invention will readily become apparent from the following detailed description of preferred embodiments of the invention when considered in connection with the appended drawing in which:

FIG. 1 diagrammatically illustrates the distribution of the contact pressure in a bearing arrangement of this invention;

FIG. 2 shows a first bearing arrangement of the invention in elevational section; and FIG. 3 is a corresponding view of a second embodiment of the invention.

Referring now to the drawing in detail, and initially to FIG. 2, there is seen as much of a hydropneumatic suspension element for a motorcar as is needed for an understanding of the invention. The cylinder 7 of the suspension element is approximately upright in its normal operating position, and its lower end wall 5 provides a sliding bearing for a piston rod 8 connected to a non-illustrated piston in the cylinder chamber 6. The lower portion of the chamber is normally filled with oil under the pressure of a cushion of compressed air, as is commonly known and not specifically illustrated, the chamber 6 thus providing a pressure differential between the two axial ends of the narrow gap 10 between the cylindrically convex surface 4 of the piston rod 8 and the corresponding, cylindrically concave surface of the end wall 5. The latter is formed with an annular groove 9 axially intermediate the end portions of the gap 10, and a resilient sealing ring 2 partly received in the recess 9 is biased outward of the recess and into engagement with the surface 4 by the pressure of another ring 1 of resilient, though somewhat harder material which is fully enclosed in the recess 9. As fas as described hereinabove, the device is basically known.

According to the invention, the radially outer wall of the recess 9 is stepped cylindrical configuration so that a part 9a of the recess 9, which is axially nearer the high-pressure chamber 6 is deeper than the part 9b nearer the end of the gap 10 which communicates with the atmosphere. The sealing ring 2 fills the shallower part 9b of the recess 9 and partly extends into the deeper part 9a. The pressure ring 1 is entirely received in the recess part 9b and its radially inwardly directed engagement face abuts against a face portion of the sealing ring 2, thereby keeping the ring 2 sealingly engaged with the surface 4. The ring 2, when in the relaxed condition, is an axially short, hollow cylinder, and is radially deformed under the pressure of the ring 1 to an extent not capable of pictorial representation on the scale of FIG. 2.

A metallic backing ring 3 similar in configuration to the relaxed ring 2 is axially juxtaposed to the ring 2. The metallic ring 3 is dimensioned for a free movable fit on the surface 4 and received in the recess portion 9a as far as it does not occupy a portion of the gap 10. The rings 2, 3 are axially secured relative to the end wall 5 by radial faces of the latter in the recess portions 9a, 9b respectively.

The radial thickness of the backing ring 3 is somewhat smaller than that of the sealing ring 2, and the rigidity of the backing ring 3 is sufficient to prevent readily measurable deformation of the ring 3 under the pressure of the resilient pressure ring 1 respective portions of, the engagement face of the latter which are axially contiguously juxtaposed, abuttingly engaging the radially outer cylindrical outer face of the backing ring 3 and the farther projecting outer face of the sealing ring 2.

During normal operation of the illustrated suspension element, the internal pressure in the cylinder chamber 6 is much above the atmospheric pressure outside the cylinder 7 and bears axially against the narrow annular face of the backing ring 3 in the gap 10. The pressure of the atmosphere acting on the annular end face of the sealing ring 2 in the gap 10 is much smaller, so that the ring 3 is pushed by the liquid in the chamber 6 axially outward of the gap 10 as far as the compressibility of the sealing ring 2 between the backing ring 3 and the radial face of the end wall 5 in the recess portion 9b permits.

The resulting distribution of the contact pressure between the sealing ring 2 and the surface 4 of the piston rod 8 is diagrammatically illustrated in FIG. 1 by a skewed curve whose maximum is located near the interface of the rings 2,3. The contact area between the ring 2 and the surface 4 at which the highest pressure prevails is only a small fraction of the axial width of the sealing ring, and the energy lost by friction between the ring 2 and the piston rod 8 is correspondingly small. Although the ring 2 is cylindrical and makes contact with the piston rod 8 along a relatively large cylindrical interface, the friction between the engaged surfaces is analogous to that normally encountered in a lip seal, and much smaller than would be possible for an equal sealing effect in the absence of the rigid backing ring 3, the sealing effect being a direct function of the highest contact pressure, but practically independent of the axial width of the annular area of highest contact pressure.

The piston rod 8 oscillates axially in the end wall 5 during normal operation of the partly illustrated suspension element and the advantages of the sealing arrangements of the invention over conventional seals are greatest under such conditions in which the direction of the pressure differential between the two ends of the gap 10 is the same as the direction of relative movement of the two elements 8,5. The illustrated sealing arrangement, however, would also be effective if the element 8 were a shaft axially secured relative to the end wall 5 and rotating in the same about its axis in the manner of the shaft of an externally driven stirrer for a pressure vessel and the like. It is essential for full effectiveness of the sealing arrangement that a pressure differential be maintained between the two end portions of the gap 10 sealed from each other by the ring 2, and that the ring 3 be exposed to the higher pressure in the gap 10.

Whether the recess 9 and the associated annular elements 1,2,3 are located in a concave surface of one of the movable elements, as shown in FIG. 2, or in a convex surface is immaterial for the operation of the sealing arrangement. FIG. 3 shows a piston 111 of a compressor mounted on a piston rod 108 in a cylinder 107, its circular radial face being exposed in a cylinder chamber 106 under the pressure of a fluid higher than the fluid pressure acting on the annular radial face of the piston 111 about the piston rod 108.

The gap 110 between the convex circumferential surface of the piston 111 and the concavely cylindrical surface 104 of the cylinder 107 is made fluid tight by three annular members 101, 102, 103 respectively corresponding to the members 1,2,3 described above with reference to FIG. 2, and received in an annular recess 109 in the otherwise cylindrical piston surface closely similar to the afore-described recess 9.

Thus, the engagement face of the pressure ring 101 is directed toward the cylinder surface 104, and respective portions of the sealing ring 102 and the backing ring 103 are interposed between the engagement face of the ring 101 and the surface 104. The face portions of the sealing ring 102 and of the backing ring 103 respectively engaged by the engagement face of the pressure ring 101 are offset radially so that the face portion of the sealing ring 102 is farther from the surface 104. The part of the recess 109 nearer the portion of the gap 110 which is at lower pressure is of smaller depth than the part of the recess nearer the portion of the gap 110 which is under the higher pressure of the cylinder chamber 106, and the deeper recess part receives as much of the sealing ring 102 as does not fill the shallower part of the recess 109. The rings 101, 102 essentially consist of elastomeric materials, and the backing ring 103 consists of more rigid metal, substantially as in the suspension element of FIG. 2.

Perfectly tight seals have been achieved in the bearing arrangements of the invention with sealing rings of synthetic elastomeric materials filled with fiber glass, carbon, or bronze powder, having moduli of elasticity between 4,000 and 6,000 Kp/cm$^2$, a Shore hardness of D55 to D70, and a coefficient of dynamic friction of 0.11 to 0.14 in contact with steel polished to mirror brightness. The best resilient sealing ring tested so far consisted of epoxy resin composition filled with 60 percent bronze powder by weight, having a modulus of 5,400 to 5,800 Kp/cm$^2$, a friction coefficient of 0.13, and a Shore hardness of D68.

The performance of the pressure rings 1, 101 is less affected by the material of construction employed. Synthetic rubber resistant to mineral oil, such as acrylonitrile-butadiene copolymer and various elastomeric fluorinated hydrocarbon polymers have been found effective under all tested operating conditions. For cooperation with sealing rings of the properties enumerated above, the pressure rings preferably have a Shore hardness of A70 to A90.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. In a bearing arrangement including two elements arranged for relative movement and having respective surfaces extending in a common direction, said surfaces defining a narrow, annular gap therebetween; means for maintaining a fluid pressure in a first portion of said gap higher than the fluid pressure in a second portion of said gap, said portions being spaced in said direction; and sealing means in a third portion of said gap intermediate said first and second portions for impeding fluid flow from said first to said second portion, one of said surfaces being formed with a recess therein, and said sealing means including a resilient sealing member partly received in said recess, and pressure means pressing said sealing member into conforming engagement with the other surface and including a resilient pressure member in said recess, the improvement in said sealing means which comprises:
a. a backing member more sized than said sealing member and movable in said gap relative to said other surface.
b. said backing member having a two oppositely directed faces spaced in said direction, and a substantially cylindrical face connecting said two faces,
c. one of said two faces abuttingly engaging said sealing member,
d. the other one of said two faces being directed toward said first portion of said gap for exposure to said higher fluid pressure,
e. said pressure member having an engagement face directed toward said other surfaces,
f. respective portions of said engagement face contiguously juxtaposed in said direction engaging a face of said sealing member and said substantially cylindrical face of said backing member.

2. In an arrangement as set forth in claim 1, the face of said sealing member engaged by said engagement face, being offset relative to the cylindrical face of said backing member in a direction away from said other surface.

3. In an arrangement as set forth in claim 1, said recess having two parts offset in said predetermined direction, the part nearer said second portion receiving a part of said sealing member and being of smaller depth than the part of said recess nearer said first portion, the latter part receiving another part of said sealing member, said pressure member, and a part of said backing member.

4. In an arrangement as set forth in claim 3, the part of said recess nearer said second portion being substantially filled with the part of said sealing member received therein.

5. In an arrangement as set forth in claim 1, said sealing member and said pressure member essentially consisting of respective elastomeric materials, and said backing member essentially consisting of a material much more rigid than the material of said pressure member.

6. In an arrangement as set forth in claim 1, the material of said sealing member having a modulus of elasticity of approximately 4,000 to 6,000 Kp/cm$^2$, a coefficient of dynamic friction relative to a highly polished steel surface of approximately 0.11 to 0.14, and a Shore hardness of D55 to D70, and said pressure member essentially consisting of synthetic elastomeric material having a Shore hardness of A70 to A90.

7. In an arrangement as set forth in claim 1, said other surface being cylindrical, and said recess being annular about the axis of said other surface.

8. In an arrangement as set forth in claim 1, said common direction being the direction of relative movement of said two elements.

* * * * *